Nov. 12, 1940.  F. H. GULLIKSEN  2,221,580
RELAY CIRCUIT
Filed Sept. 7, 1939
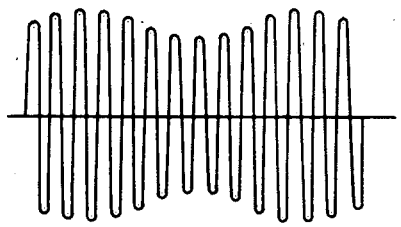
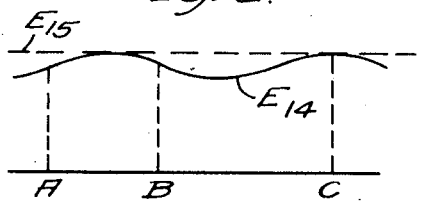
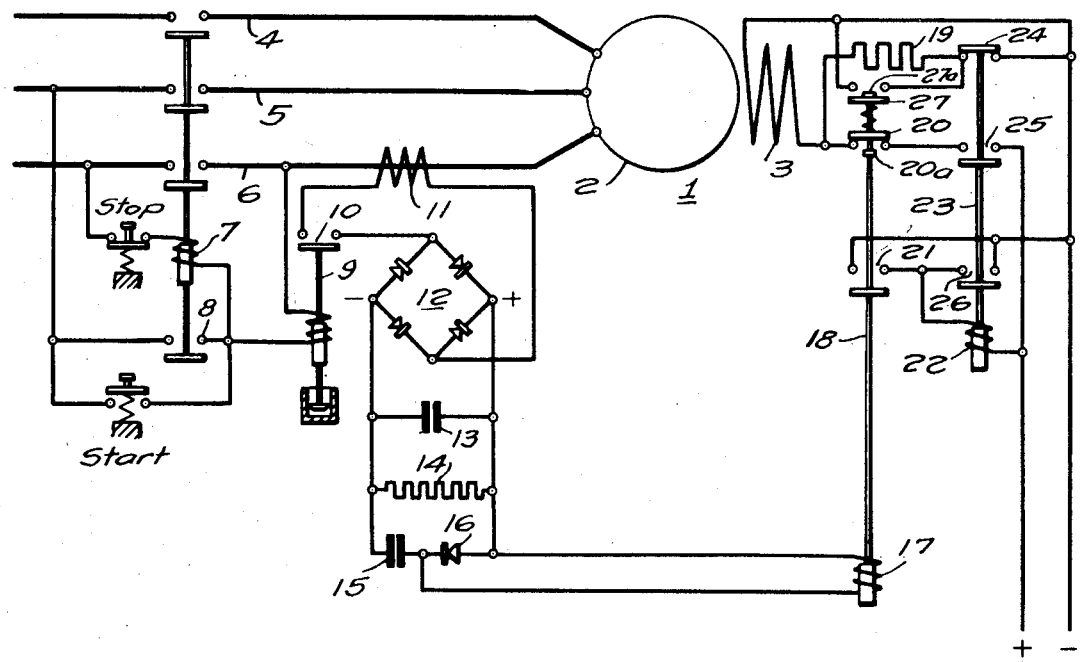
INVENTOR
Finn H. Gulliksen.
BY
Paul E. Friedemann
ATTORNEY Patented Nov. 12, 1940

2,221,580

UNITED STATES PATENT OFFICE 2,221,580

RELAY CIRCUIT

Finn H. Gulliksen, Pittsburgh, Pa., assignor to Westinghouse Electric & Manufacturing Company, East Pittsburgh, Pa., a corporation of Pennsylvania Application September 7, 1939, Serial No. 293,725

10 Claims. (Cl. 172—289)

My invention relates to an automatic starting system for synchronous motors and the like.

More specifically, it is directed to a control means which is effective, not only to connect a direct current source to the field winding of the synchronous motor, when it has substantially reached synchronous speed, but which is effective also to apply such direct current energization at the correct moment which, for example, will afford maximum pull-in torque.

In the past, many schemes have been devised for withholding direct current energization of the field winding of the synchronous motor until very near synchronous speed of the motor has been obtained. Examples of such devices are a time delay relay, a relay responsive to the frequency of the induced voltage in the short-circuited field winding during starting, and a relay responsive to the frequency of the induced voltage in the armature or stator winding during starting. It has also been found during the past that it is necessary not only to effect switching at or near synchronous speed, but the switching should occur at a time when the induced field current has a certain polarity or better still, at the moment the pole pieces on which the field winding is wound are at a predetermined position with respect to a given point on the wave of alternating current supplied to the armature or stator winding in order, for example, to afford maximum pull-in torque at synchronization. This latter type of control is often referred to as "angle switching."

An object of my invention is to provide a control means for the purpose of controlling application of the direct current source to the field winding of a synchronous motor so that energization of the field will occur only at near synchronous speed and including "angle switching" means for effecting energization of the field winding at a moment which will afford maximum pull-in torque of the motor at synchronization.

Another object of my invention is to provide an automatic control system for synchronous motor starting which is simple, inexpensive, instantaneously responsive, and reliable in operation.

Other objects and advantages will become more apparent from a study of the following specification when considered in conjunction with the accompanying drawing, in which:

Figure 1 shows graphically the characteristics of the starting current in the stator or armature winding of a synchronous motor;

Fig. 2 shows graphically the characteristics of the starting current in Fig. 1 when rectified and after the higher harmonics have been suppressed; and Fig. 3 is a diagrammatic showing of a control system showing an embodiment of my invention.

It is a well known fact that a synchronous motor, while operating below synchronous speed, induces a current in the field winding by transformer action. It has been discovered that the interaction of this induced field current and the alternating current flowing in the stator modifies the characteristics of a starting current in the armature of the synchronous motor in the manner shown in Fig. 1. The Shand Patent No. 1,994,900, issued March 19, 1935, shows a control scheme which makes use of the modulations in the starting current, such as shown in Fig. 1, which modulations correspond exactly to the slip frequency. In the Shand device when the slip frequency has been decreased to a predetermined amount, that is, when a speed which is slightly short of synchronous speed has been reached a relay is made responsive to such critical slip frequency modulations in the stator winding to effect energization by direct current of the field winding and synchronization of the synchronous motor.

The current wave such as shown in Fig. 1 usually consists of a 60-cycle current which has varying magnitude modulated in proportion to the slip frequency. The location of the peaks of the curve in Fig. 1 has a definite relation to the position of the rotor relative to the stator winding and can therefore be used to initiate an angle switching relay. It is not practicable to operate a relay directly from the current shown in Fig. 1 because the peak value of current will vary with the line voltage and the motor load.

In accordance with my invention shown more particularly in Fig. 3, a control system is provided which effects switching from the starting connections to the running connections at the proper moment to effect an optimum synchronization, which switching means does not change in effectiveness with changes in line voltage or motor load.

In Fig. 3 a synchronous motor 1 is shown having a stator or armature winding 2 and a rotor or field winding 3. The stator 2 is energized by a suitable three-phase source of alternating current potential through buses 4, 5, and 6.

The function of the various parts of the control system will become more apparent by a description of the operation of the control system which is as follows. When the "start" button is depressed, a circuit is completed from bus 5 through the "start" push button, line contactor relay coil 7, the "stop" push button to bus 6 thereby effecting closing of the contact members of the line contactor so as to complete an energizating circuit through the stator. At the same time contact members 8 are closed forming a bridging circuit across the "start" push button contact members, thereby forming a holding circuit which will insure continued energization of relay coil 7 after the "start" push button has been released.

At the same time another circuit is completed through the actuating coil of the time limit relay 9. After a predetermined period of time which corresponds to the time necessary to allow the synchronous motor 1 to come up to nearly synchronous speed, time limit relay 9 will close contact members 10 thereby completing a circuit through the secondary winding 11 of a current transformer and through the input terminals of a full-wave rectifier unit 12 preferably of the rectox type.

It will be apparent that the current wave form applied to the input terminals of the rectifier will be substantially the same as that shown in Fig. 1 (except substantially 180° out of phase therewith). Rectifier 12 eliminates the lower half of such wave form while condenser 13 substantially smooths out the ripples and eliminates the higher harmonics of the remaining wave form, consequently a voltage wave is impressed across resistor 14 which is of a form denoted as $E_{14}$ in Fig. 2. Connected in series with resistor 14 are a condenser 15 and a half-wave rectifier 16. The capacitance of condenser 15 is of comparatively high magnitude so that the voltage of condenser 15, denoted as $E_{15}$ in Fig. 2, will remain substantially constant while the voltage in the current transformer varies in a manner similar to that shown in Fig. 1. For this reason voltage $E_{15}$ may be represented as a straight horizontal line. Actuating coil 17 of relay 18 is connected in parallel with rectifier 16 and has a voltage impressed across its terminals equal to the difference between voltages $E_{14}$ and $E_{15}$.

When the motor is started up a discharge resistor 19 is connected, in a conventional manner, across field winding 3. After a predetermined time interval during which the motor has been given sufficient time to come up to nearly synchronous speed, the time limit relay 9 closes contact members 10 thereby completing a circuit through the secondary 11 of the current transformer which in turn will furnish energizing current which is rectified and a portion of which, corresponding to the difference between voltages $E_{14}$ and $E_{15}$, is passed through actuating coil 17 thereby effecting closing of contact members 27 and immediately thereafter effecting opening of contact members 20 due to engagement of collar 20a on the bridging element, and closing of contact members 21 with a time sequence in the order named. The bridging elements of contact members 20 and 27 are interconnected by a spring and being both slidable on the stem.

Closing of contact members 21 completes a circuit through the actuating coil 22 of relay 23 which effects opening of contact members 24 and closing of contact members 25 and 26 forming a sealed-in preparatory circuit or set-up circuit which awaits only the closing of contact members 20 in order to complete a direct current energizing circuit through the field winding 3, that is, the circuit extending from the positive terminal through contact members 25 and 26, field winding 3 to the negative terminal of the direct current source. The purpose of contact members 27 is to form a parallel path for shorting discharge resistor 19 while contact members 24 are open. Referring to Fig. 2 it will be noted that when the motor has started and the angle switching equipment is connected in the control circuit after a predetermined time, for example, at point A, nothing happens until relay 18 picks up, say, at position B. At this point relay 23 is energized and seals itself in by virtue of the bridging contact members 26. At point C relay 18 is deenergized since the voltage difference between $E_{14}$ and $E_{15}$ is zero and the motor field winding 3 is energized due to closing of contact members 20 and the angle switching is completed. A short instant after closing of contact members 20, collar 27a opens contact members 27 thereby opening a circuit through discharge resistor 19. When it is desired to stop motor 1 the "stop" push button is depressed which deenergizes relay coil 7 and opens the line conductors thereby interrupting the energizing current for the stator or armature winding.

While point C has been chosen for actuation of relay 18, it will be apparent that any other point, say between B and C may equally be selected, for example, the point of maximum voltage difference between $E_{14}$ and $E_{15}$ may be selected. While it is usually desirable to synchronize at a moment which affords maximum pull-in torque, such is not always desirable. For example, in certain instances to synchronize with maximum pull-in torque might cause undesirable line disturbances, hence, it would be preferable to synchronize with slightly less than maximum pull-in torque.

It will be apparent that the control system in accordance with my invention since it is dependent upon the difference in voltage between $E_{14}$ and $E_{15}$, is not influenced by changes in line voltage or changes in motor load. Consequently, irrespective of the magnitude of condenser voltage $E_{15}$ there will still be a voltage difference of zero which periodically occurs once every cycle representing the voltage difference between $E_{14}$ and $E_{15}$ which affords a dependable control voltage for operating relay 18.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. A control system for starting a synchronous motor, comprising, in combination, a synchronous motor having a stator or armature winding, a source of electrical potential for said armature winding including a plurality of buses and a rotor or field winding, starting and running connections for the field winding, and differential relay means responsive to the difference between a substantially constant voltage initiated by said source and a voltage bearing modulations of the current in the armature winding during starting of said motor, for switching from the starting to the running connections of the field winding, said means having the same effectiveness irrespective of variations in line voltage or motor load.

2. A control system for starting a synchronous motor, comprising, in combination, a synchronous motor having a stator or armature winding, a source of electrical potential for said armature winding including a plurality of buses, and a rotor or field winding, starting and running connections for the field winding, and differential relay means responsive to the difference between a substantially constant voltage initiated by said source and a voltage bearing modulations of the current in the armature winding during starting of said motor, for switching from the starting to the running connections of the field winding, and means having an effectiveness which is not decreased as the result of decrease in line voltage or change in motor load.

3. A control system for starting a synchronous motor, comprising, in combination, a synchronous motor having a stator or armature winding, a source of electrical potential for said armature winding including a plurality of buses and a rotor or field winding, starting and running connections for the field winding, and means responsive to modulations of the current in the armature winding during starting of said motor for switching from the starting to the running connections of the field winding, said means including a rectifier for rectifying a current responsive to the armature current together with a resistor connected across the output terminals of said rectifier, and a condenser and second rectifier serially connected across the terminals of said resistor and a relay coil connected in parallel with said second rectifier, switching means responsive to said relay for switching from said starting connections to said running connections.

4. A control system for starting a synchronous motor, comprising, in combination, a synchronous motor having a stator or armature winding, a source of electrical potential for said armature winding including a plurality of buses and a rotor or field winding, starting and running connections for the field winding, and means responsive to modulations of the current in the armature winding during starting of said motor for switching from the starting to the running connections of the field winding, said means including a rectifier for rectifying a current responsive to the armature current together with a resistor connected across the output terminals of said rectifier, and a condenser and second rectifier serially connected across the terminals of said resistor, a second condenser connected across the terminals of said resistor, and a relay coil connected in parallel with said second rectifier, switching means responsive to said relay for switching from said starting connections to said running connections.

5. A control system for starting a synchronous motor, comprising, in combination, a synchronous motor having a stator or armature winding, a source of electrical potential for said armature winding including a plurality of buses and a rotor or field winding, starting and running connections for the field winding, a current transformer secondary which is fed from one of said buses, a rectifier having input and output terminals, the input terminals being connected across said current transformer secondary, a resistor connected across the output terminals of said rectifier, a second rectifier and a condenser serially connected across the terminals of said resistor, a relay connected across said second rectifier, switching means responsive to said relay for switching from said starting connections to said running connections.

6. A control system for starting a synchronous motor, comprising, in combination, a synchronous motor having a stator or armature winding, a source of electrical potential for said armature winding including a plurality of buses and a rotor or field winding, starting and running connections for the field winding, a current transformer secondary which is fed from one of said buses, a rectifier having input and output terminals, the input terminals being connected across said current transformer secondary, a resistor connected across the output terminals of said rectifier, a second rectifier and a condenser serially connected across the teminals of said resistor, a relay connected across said second rectifier, switching means responsive to said relay for switching from said starting connections to said running connections, time delay means for delaying energization of said current transformer for a definite time interval following completion of a circuit through said buses and armature winding.

7. A control system for starting a synchronous motor, comprising, in combination, a synchronous motor having a stator or armature winding, a source of electrical potential for said armature winding including a plurality of buses and a rotor or field winding, starting and running connections for the field winding, a current transformer secondary which is fed from one of said buses, a rectifier having input and output terminals being connected across said current transformer secondary, a resistor connected across the output terminals of said rectifier, a second rectifier and a condenser serially connected across the terminals of said resistor, a second condenser connected across the terminals of said resistor, a relay connected across said second rectifier, switching means responsive to said relay for switching from said starting connections to said running connections.

8. A control system for starting a synchronous motor, comprising in combination, a synchronous motor having a stator or armature winding, a source of electrical potential for said armature winding including a plurality of buses, and a rotor or field winding, starting and running connections for the field winding, and means responsive to modulations of the current in the armature winding during starting of said motor for switching from the starting to the running connections of the field winding, said means including a condenser having substantially high capacitance and substantially constant voltage and a resistor which has a voltage which varies in accordance with said modulations together with a relay which is responsive to the difference of said condenser voltage and resistor voltage for effecting switching from the starting connections to the running connections at some predetermined value of voltage difference.

9. A control system for starting a synchronous motor, comprising in combination, a synchronous motor having a stator or armature winding, a source of electrical potential for said armature winding including a plurality of buses and a rotor or field winding, starting and running connections for the field winding, and means responsive to modulations of the current in the armature winding during starting of said motor for switching from the starting to the running connections of the field winding, said means including a condenser having substantially high capacitance and substantially constant voltage and a resistor which has a voltage which varies in accordance with said modulations together with a relay which is responsive to the difference of said condenser voltage and resistor voltage for effecting switching from the starting connections to the running connections at some predetermined value of voltage difference, said condenser voltage and resistor voltage coinciding in value once every cycle of slip frequency.

10. A control system for starting a synchronous motor, comprising in combination, a synchronous motor having a stator or armature winding, a source of electrical potential for said armature winding including a plurality of buses and a rotor or field winding, starting and running connections for the field winding, and means responsive to modulations of the current in the armature winding during starting of said motor for switching from the starting to the running connections of the field winding, said means including a condenser having substantially high capacitance and substantially constant voltage and a resistor which has a voltage which varies in accordance with said modulations together with a relay which is responsive to the difference of said condenser voltage and resistor voltage for effecting switching from the starting connections to the running connections at some predetermined value of voltage difference, said condenser voltage and resistor voltage coinciding in value once every cycle of slip frequency, time delay means for making said first mentioned means inoperative until a predetermined time interval following energization of said buses.

FINN H. GULLIKSEN.